Dec. 9, 1952  G. S. KOLSTAD  2,621,008
POULTRY ROOST SUPPORT
Filed May 13, 1949  2 SHEETS—SHEET 1
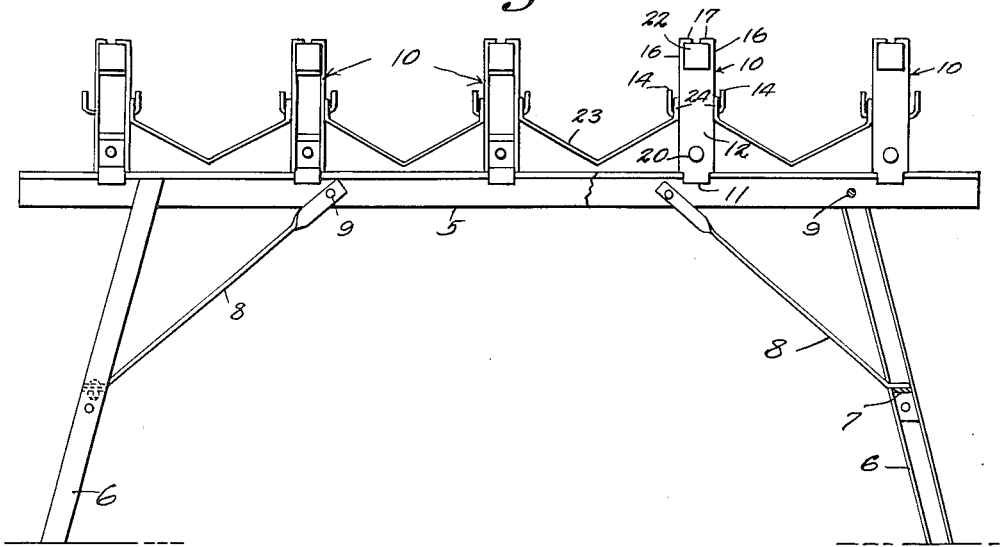
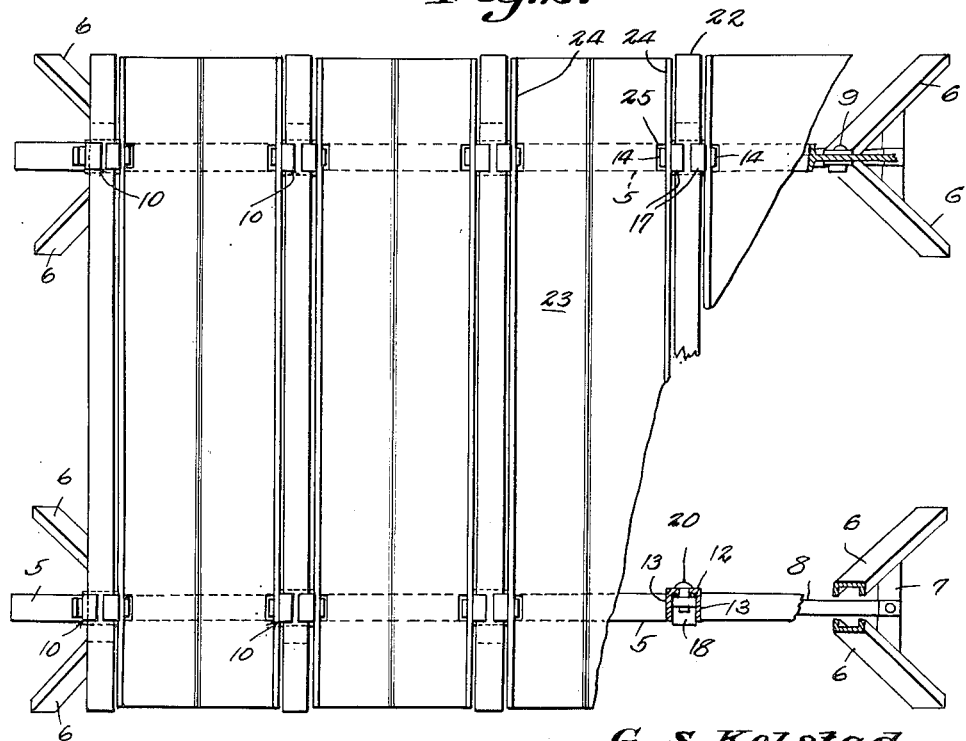
G. S. Kolstad
INVENTOR
BY *CA Snow & Co.*
ATTORNEYS.

Dec. 9, 1952      G. S. KOLSTAD      2,621,008
POULTRY ROOST SUPPORT
Filed May 13, 1949      2 SHEETS—SHEET 2
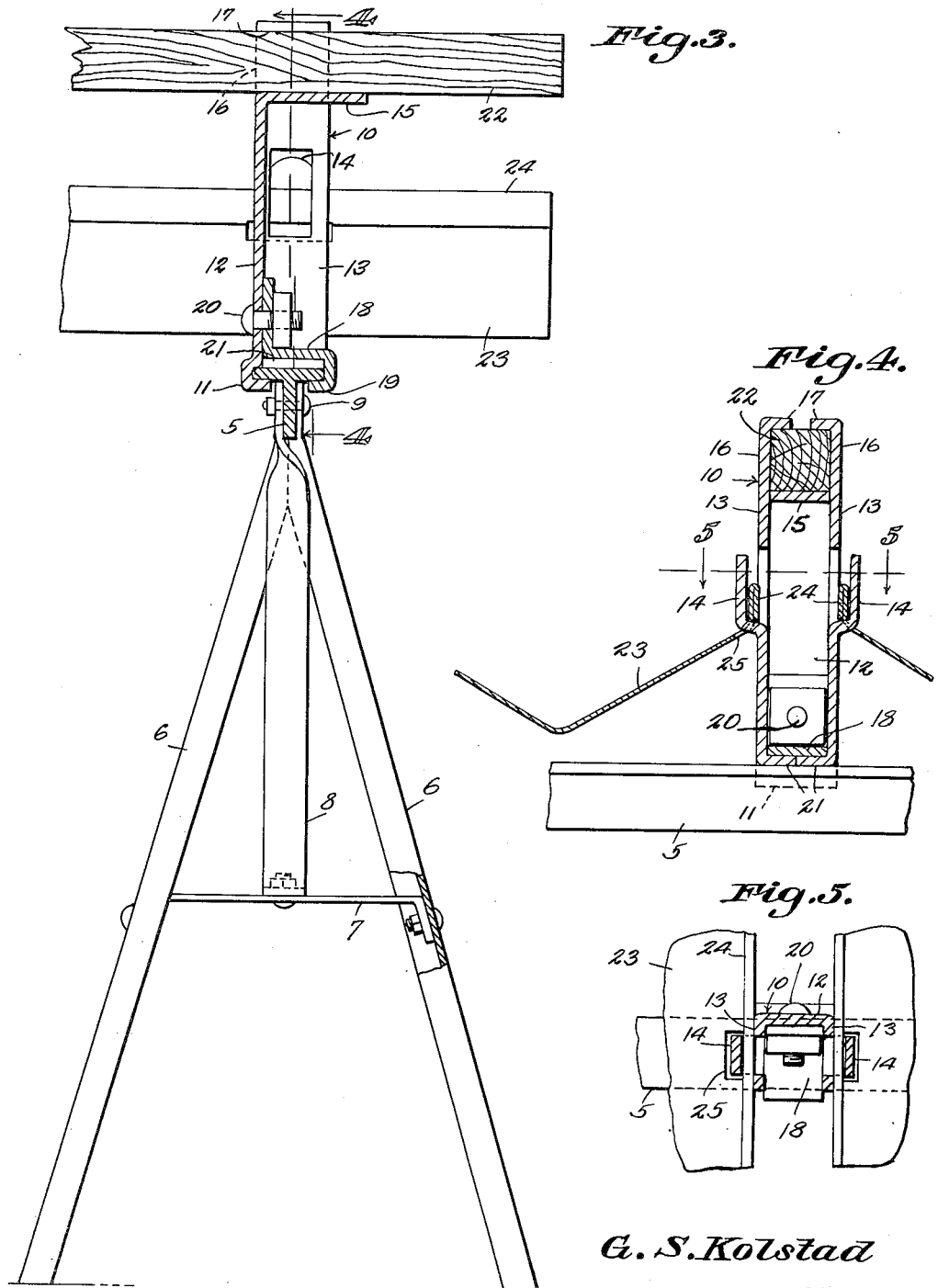
G. S. Kolstad
INVENTOR Patented Dec. 9, 1952

2,621,008

UNITED STATES PATENT OFFICE 2,621,008

POULTRY ROOST SUPPORT

Gilbert S. Kolstad, Austin, Minn.

Application May 13, 1949, Serial No. 93,141

2 Claims. (Cl. 248—228)

This invention relates to roosts for chickens or turkeys, of the type shown, for example, in my previous Patent Number 1,870,125 dated August 2, 1932.

Some important objects of the present invention are to provide a poultry roost which is not fastened to any part of the poultry house; can be easily disassembled for cleaning, washing, sunning, and disinfecting; will be entirely of metal with the exception of the roosting pole; so that no wood will touch wood in a manner to furnish a nesting place for vermin; is equipped with V-shaped litter troughs so as to facilitate cleaning with an implement such as a hoe; will accommodate a large quantity of chickens or other poultry; and will be capable of being constructed, shipped, or stored at relatively low cost.

Other important objects are to provide a poultry roost construction in which the roosting pole will not be fastened to the litter troughs, but will instead be separately mounted upon the structure so as to make for easier handling and a more thorough cleaning operation; wherein the troughs will be hung at an elevation sufficiently below that of the roosting poles as to permit air to flow in under the roosting chickens, in the chicken roost embodiment of the invention; wherein there will be a novelly formed saddle specially formed and adjustably mounted upon the structure, and capable by reason of its particular construction of supporting both the roosting poles and litter troughs in the manner desired; and wherein the entire structure will be of the knock-down type so as to permit swift assembly and disassembly, and so as to permit individual cleaning of all parts.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 1 is a side elevational view of a poultry roost constructed in accordance with the invention, portions being broken away.

Fig. 2 is a view partly in top plan and partly in horizontal section.

Fig. 3 is an enlarged fragmentary vertical section through one of the saddles and parts associated therewith.

Fig. 4 is a section on line 4—4 of Fig. 3.

Fig. 5 is a section on line 5—5 of Fig. 4.

Referring to the drawings in detail, I provide a pair of elongated side rails 5 spaced apart any desired distance and parallel. The side rails 5 are preferably T-irons and are each supported at opposite ends by pairs of upwardly converging legs 6 here shown as channel members and suitably braced as at 7 and 8 relative to each other and to the side rails which they support. The side rails 5 are received between the flattened upper ends of the legs 6 and are secured to and between said flattened upper ends by means of fastening means 9. Each of the parallel side rails 5 provides a trackway on which is slidably mounted a plurality of saddles designated generally 10. These saddles cooperate to support transversely extended roosting poles and litter troughs, and the construction of each saddle is particularly shown in Figs. 3 to 5.

Referring to these figures it may be noted that each saddle is readily fashioned from sheet metal material, and a blank of such material is so formed as to provide a bottom flange 11 slidably embracing one side edge of the side rail 5, and formed integral with the lower end of an upstanding body portion or web 12 of the saddle, there being extended from the opposite sides of said web the side walls 13 disposed transversely across the side rails 5 of the supporting frame. Thus, the web 12 and side walls 13 cooperate to define an upstanding saddle which is of generally U-shaped or channeled cross sectional contour.

Intermediate the top and bottom edges of the side walls 13, I provide the outstruck hooks or ears 14 that support the litter troughs in a manner to be described.

At its upper end the web 12 is integrally formed with a lateral or horizontal extension 15 that provides a support for the roosting poles, and the side walls 13 are provided at their upper ends with the upstanding spaced extensions 16 having at their upper ends the inturned lips 17.

For the purpose of providing the desired slidable mounting of the saddles 10 upon the side rails 5, I provide the angle brackets 18 disposed within the lower ends of said saddles and formed integral with the depending flanges 19 that are complementary to the flanges 11. Fastening means 20 are employed for the purpose of securing the brackets 18 to the web 12 of the saddles, and thus there is provided a saddle having at its lower end a slidable connection with the side rails, an upstanding body, trough-engaging side hooks, and at its upper end, a recess of non-circular cross section providing a seat for a roosting pole with said pole being slidable in said seat. In this connection, it may be noted that for the purpose of reinforcing the lower end of the saddle 10, the lower ends of the side walls 13 of said saddle are inturned as at 21 between the side rails and the brackets 18, this construction being best shown in Fig. 4.

The roosting poles utilized in the structure are designated 22 and comprise elongated wooden poles of non-circular cross section, here shown as square or rectangular, the ends of said roosting poles being slidably extended through the saddles at opposite sides of the structure. Said roosting poles are extended transversely, in spaced parallel relation, across the supporting structure, and can accommodate a large number of roosting fowl.

Extending between the spaced roosting poles are the litter troughs 23 that are also extended transversely of the structure, said troughs 23 being of sheet metal material and of V shape in cross section for the purpose of facilitating cleaning thereof with a tool such as a V-shaped hoe or for that matter, a conventional hoe. As may be noted particularly from Figs. 3 to 5 inclusive, the troughs in the present instance have upturned side flanges 24 adapted to abut against the spaced saddles 10, and formed in the side portions of each trough, at intervals spaced longitudinally of the trough, are the openings 25 receiving the hooks or ears 14, as best seen from Fig. 4.

The embodiment of the invention which has been illustrated in the drawings is particularly adapted for use as a chicken roost. In this connection, it may be noted that the entire assemblage is of knock-down formation, and the complete structure can be readily assembled or disassembled in minimum time, so as to facilitate shipment, storage, and cleaning of each and every individual part of the structure.

Thus, assuming that the assembled roost is to be knocked down, the user first withdraws the roosting poles 22 which are simply slidably positioned in their seats at the tops of the respective saddles. After pulling out these poles, the user simply lifts the various troughs 23 off the projections 14, and the saddles 10 are now free for slidable movement along the respective side rails, and can be slipped off said side rails by being slid off the ends of the side rails. The complete structure, to all intents and purposes, has now been disassembled, but if further disassembly is desired, one need only remove the fastening means 9 for the purpose of lifting the side rails off the legs 6, thus to disassemble the complete structure for cleaning of all individual parts.

The structure is reassembled with equal ease, as will be readily appreciated.

I believe it should be understood that the principles of the invention can readily be embodied in turkey roosts as well as chicken roosts, the invention being applicable to any type of poultry roost. For example, the invention is capable of use as a turkey roost on open range. Where the invention would be applied for this purpose, the roost would, as will be appreciated, be larger than it would be for chickens, as to general dimensions of all component parts. Additionally, I would propose in this instance to eliminate the inturned lips 17 so that the roosting poles can be lifted off their seats, and I would in this instance slip the litter troughs 23 directly over the upwardly extended portions 16 of the side walls of the saddles, so that said extensions 16 in effect are substituted for the projections 14, with said extensions 16 extending through the openings 25 of the litter troughs. The purpose of this would be to furnish a rain-proof shelter for turkeys on open range, with the roosting poles closing up the spaces between adjacent litter troughs so that said poles and troughs in effect provide a roof under which turkeys can huddle during storms and rain.

What is claimed is:

1. A saddle for a poultry roost comprising an upwardly extending channel member having vertically disposed side walls and a vertically disposed web extending between and integrally joining said side walls, a support engaging flange carried by the web adjacent the lower end thereof for holding the channel member in an upstanding position upon a support, outwardly offset ears carried by the respective side walls of the channel member substantially midway between the upper and lower ends thereof for supporting a litter trough on said saddle, and a horizontal extension carried by the web and lying between the side walls adjacent the upper ends thereof to form a perch support.

2. A saddle for a poultry roost comprising an upwardly extending channel member having vertically disposed side walls and a vertically disposed web extending between and integrally joining said side walls, a support engaging flange carried by the web adjacent the lower end thereof for holding the channel member in an upstanding position upon a support, outwardly offset ears carried by the respective side walls of the channel member substantially midway between the upper and lower ends thereof for supporting a litter trough on said saddle, a horizontal extension carried by the web and lying between the side walls adjacent the upper ends thereof to form a perch support, and a clamping bracket carried by the web adjacent the lower ends of the side walls for cooperating with the support engaging flange in clamping the saddle on a support.

GILBERT S. KOLSTAD.

REFERENCES CITED

The following references are of record in the file of this patent:

UNITED STATES PATENTS

| Number | Name | Date |
|---|---|---|
| 1,039,826 | Schwartzburg | Oct. 1, 1912 |
| 1,186,669 | Lindbloom | June 13, 1916 |
| 1,447,460 | Beatty | Mar. 3, 1923 |
| 1,646,334 | Wollenhaupt | Oct. 18, 1927 |
| 1,786,443 | Moomaw | Dec. 30, 1930 |
| 1,870,125 | Kolstad | Aug. 2, 1932 |